Nov. 3, 1964  V. J. EDGAR  3,155,412
PUSH LOCK TURN SCREW
Filed Aug. 29, 1963
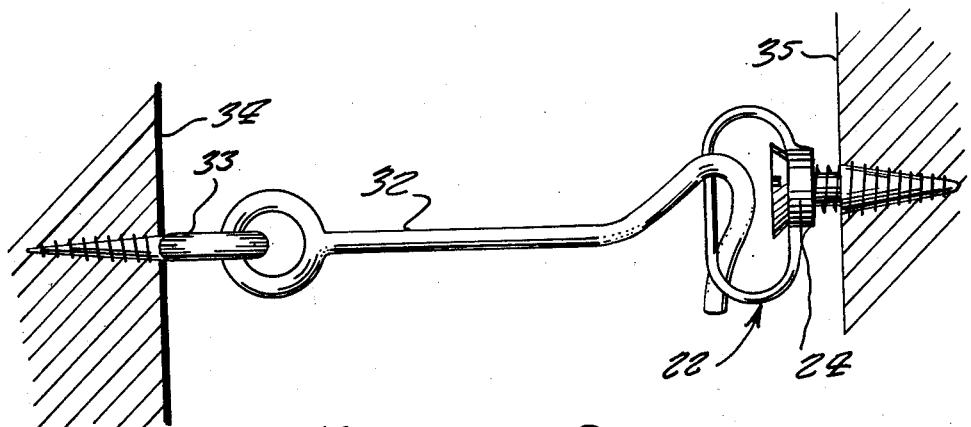
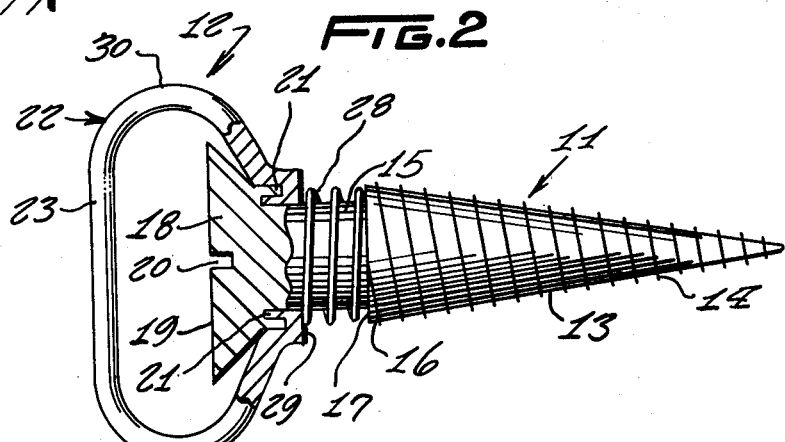
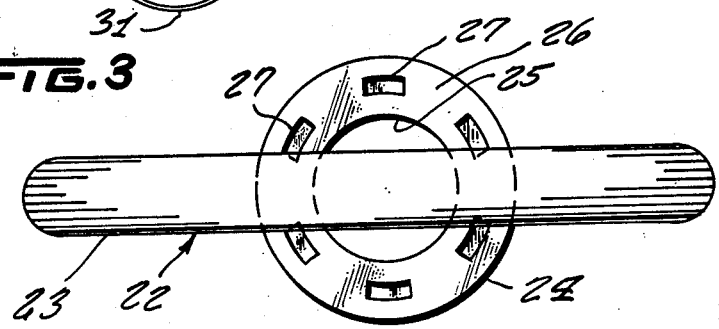
INVENTOR.
Violet J. Edgar

United States Patent Office 3,155,412
Patented Nov. 3, 1964

3,155,412
PUSH LOCK TURN SCREW
Violet J. Edgar, 6180 E. 47th St. S., Wichita, Kans.
Filed Aug. 29, 1963, Ser. No. 305,419
4 Claims. (Cl. 292—341.17)

This invention relates generally to locking devices. More specifically, it relates to lock hooks.

One object of the present invention is to provide a hook and push turn screw lock having self-contained means whereby a snap hook engaged therewith cannot be released by any unauthorized person, such as by small children, prowlers or the like.

Another object of the present invention is to provide a screw lock having self-contained locking means which is adaptable for use upon gates, barn doors, small screen doors, windows or the like.

Still another object of the present invention is to provide a screw lock which cannot be unhooked by a wire or knife blade but which has inherent self-contained means which permit unlocking of a snap hook only by persons having a knowledge of the working principles of the screw lock; and thus a further object of the present invention is to provide a screw lock which will permit safety by preventing access through doors and windows to certain persons or small children.

Other objects of the invention are to provide a screw lock bearing the above objects in mind which is of simple construction, has a minimum number of parts, is inexpensive to manufacture and efficient in operation and use.

For other objects and for a better understanding of the invention, reference may be had to the following detailed description taken in conjunction with the accompanying drawing, in which:

FIGURE 1 is a side elevational view of the present invention shown in operative use;

FIGURE 2 is an enlarged side elevational view, partly in cross section of the invention per se;

FIGURE 3 is an end view of one of the elements which comprises the present invention.

Referring now to the drawing in detail, the numeral 12 represents a screw lock according to the present invention wherein there is a screw element 11, an eye ring 22 and tension means whereby the eye ring and screw element are retained in engaged relation. The screw element comprises a longitudinal shank 13 of generally conical configuration which is provided with thread 14 for the purpose of engagement with any wooden object. The opposite end of the shank is provided with a cylindrical portion 15 which is of a diameter less than the adjacent conical base portion 16, thereby producing a shoulder 17 therebetween. The terminal end of the cylindrical portion is provided wtih a head 18 of conventional flat head type wherein the head is of conical configuration having a flat outer side 19 and having a screw driver slot 20 thereacross. At the base of the head 18 and adjacent to the cylindrical portion 15 there are a plurality of projecting teeth 21 which extend in a longitudinal direction opposite the head. An eye ring 22 is mounted rotatably free upon the cylindrical portion 15 of the screw element, the eye ring comprising a generally oval shaped ring 23 and a circular base 24. The axis thereof is perpendicular to the axis of the ring 23. The base 24 is provided with a central opening 25 for receiving therethrough the cylindrical portion 15 of the screw element. The side 26 of the circular base 24 is provided with a plurality of recessed slots 27 in spaced apart, equal relationship which are for the purpose of receiving therein the projecting teeth 21 of the screw element. It is to be noted that when the eye ring circular base 24 is moved longitudinally away from head 18 of the screw element the teeth 21 and slots 27 are disengaged, thereby permitting the eye ring to rotate about the cylindrical portion 15 of the screw element. However, when the eye ring circular base 24 is moved in a longitudinal direction toward the head 18 of the screw element the teeth of the screw element become engaged within the recessed slots of the eye ring. A compression coil spring 28 is fitted around the cylindrical portion 15, one end of the spring bearing against shoulder 17 of the screw element and the other end of the spring bearing against the underside 29 of the circular base 24. Thus, when at rest the eye ring is in engagement with the screw element, thereby preventing rotational movement of the eye ring upon the screw element. It is to be noted, as is shown in the drawing, that the ring 23 is offset toward one lateral side, respective to the axis of the circular base opening 25. Thus, when the eye ring is rotated about cylindrical portion 15 the side portion 30 of ring 23 travels on the shorter radial path than the side 31.

In operative use an ordinary snap hook 32 is provided with an eye screw 33 which is engaged threadedly in a stationary post or other object 34, where as the screw lock is threadedly engaged in a gate, door or other movable object 35. When it is desired that the movable object not be moved, the snap hook is engaged in the eye ring and the eye ring is rotated about the screw element until the snap hook is securely jammed within the ring 23. An unauthorized person is unable to release the hook from the eye ring because he does not know how to move the eye ring rotatably about the screw element for purpose of disengaging the same. However, an authorized person will readily know that to unhook the snap hook, he need only to depress the eye ring against the spring 28, thereby disengaging the teeth 21 from the recessed slots 27, thus allowing the eye ring to rotate about the cylindrical portion 15 of the screw element.

While various changes may be made in the detail construction, it shall be understood that such changes shall be within the spirit and scope of the present invention as defined by the appended claims.

Having thus set forth and described my invention, what I claim is:

1. In a screw lock, the combination of a screw element and an eye ring, said eye ring being secured rotatably free upon said screw element and means for arresting the rotative movement of said eye ring upon said screw element, said screw element comprising a longitudinal shank of conical configuration, said shank being screw threaded, one end of said shank forming a point of said screw element, and the other end of said shank having a cylindrical portion adjacent thereto, said cylindrical portion being of a diameter which is less than the adjacent conical portion of said shank, thereby forming a shoulder between said cylindrical portion and said conical shank, a screw head at the opposite end of said cylindrical portion, said head being of generally conical configuration having a flat end wall and said means for arresting said rotational movement of said eye ring upon said screw element being located at the junction of said head and said cylindrical portion of said screw element.

2. In a screw lock, the combination as set forth in claim 1 wherein said eye ring comprises an oval ring and a circular base portion, said circular base portion having an axis which is perpendicular to the general axis of said circular portion of said eye ring, said circular portion having a central opening extending therethrough for receiving therein the said cylindrical portion of said screw element and said circular portion having associate means for arresting rotational movement of said eye ring upon said screw element.

3. In a screw lock the combination as set forth in claim 2 wherein said means for arresting said rotational movement of said eye ring and said means associate therewith comprises a plurality of projecting teeth at the base of said screw element head, said teeth projecting longitudinally away from said head and said eye ring circular base having a plurality of spaced apart recessed slots for receiving therein said projecting teeth of said screw element.

4. In a screw lock the combination as set forth in claim 3 wherein a compression coil spring is fitted around said cylindrical portion of said screw element, one end of said spring bearing against said shoulder of said screw element and the other end of said spring bearing against the underside of said circular base of said eye ring.

References Cited in the file of this patent
UNITED STATES PATENTS

| | | |
|---|---|---|
| 2,203,500 | Loggins | June 5, 1940 |
| 2,665,152 | Piercey | Jan. 5, 1954 |